United States Patent
Shimono et al.

(10) Patent No.: US 11,707,897 B2
(45) Date of Patent: Jul. 25, 2023

(54) METHOD FOR PRODUCING COMPOSITE MATERIAL, FIBER BASE MATERIAL, AND SHAPING MOLD FOR FIBER BASE MATERIAL

(71) Applicant: MITSUBISHI HEAVY INDUSTRIES, LTD., Tokyo (JP)

(72) Inventors: Kodai Shimono, Tokyo (JP); Hiroshi Tokutomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 99 days.

(21) Appl. No.: 16/957,248

(22) PCT Filed: Feb. 13, 2019

(86) PCT No.: PCT/JP2019/004983
§ 371 (c)(1),
(2) Date: Jun. 23, 2020

(87) PCT Pub. No.: WO2019/159926
PCT Pub. Date: Aug. 22, 2019

(65) Prior Publication Data
US 2020/0391455 A1 Dec. 17, 2020

(30) Foreign Application Priority Data
Feb. 13, 2018 (JP) .................... 2018-022782

(51) Int. Cl.
*B29C 70/48* (2006.01)
*B29C 70/54* (2006.01)
(Continued)

(52) U.S. Cl.
CPC ............ *B29C 70/547* (2013.01); *B29C 70/08* (2013.01); *B29C 70/10* (2013.01); *B29C 70/48* (2013.01);
(Continued)

(58) Field of Classification Search
CPC ....... B29C 70/547; B29C 70/08; B29C 70/10; B29C 70/48
See application file for complete search history.

(56) References Cited

U.S. PATENT DOCUMENTS 2,913,036 A * 11/1959 Smith ................... B29C 70/865
 264/102
4,560,523 A * 12/1985 Plumley ................ B29C 70/443
 264/102
(Continued)

FOREIGN PATENT DOCUMENTS

EP 3023236 A1 5/2016
JP S51-092864 A 8/1976
(Continued)

OTHER PUBLICATIONS

English Translation of Japanese Patent Publication No. 2005-262818 A, published Sep. 29, 2005; Application No. 2004-82650, filed Mar. 22, 2004; Inventors: Ikuo Horibe, Eisuke Wadahara, and Hiroki Kihara; Assignee: Toray Industries, 32 pages. (Year: 2005).*

(Continued)

*Primary Examiner* — Matthew J Daniels
(74) *Attorney, Agent, or Firm* — Manabu Kanesaka; Benjamin Hauptman; Kenneth Berner

(57) ABSTRACT

A method for producing a composite material in which a first fabric and a second fabric made from a fiber material are impregnated with a thermosetting resin and integrally molded, wherein a resin flow path through which thermosetting resin flows is provided between the first fabric and the second fabric, and the first fabric and the second fabric are impregnated with thermosetting resin from the resin flow path as well as being impregnated with thermosetting resin from the surface.

5 Claims, 4 Drawing Sheets

(51) Int. Cl.
  *B29C 70/08* (2006.01)
  *B29C 70/10* (2006.01)
  *B29C 70/52* (2006.01)
  *B29K 101/10* (2006.01)

(52) U.S. Cl.
  CPC ........ *B29C 70/528* (2013.01); *B29K 2101/10* (2013.01)

(56) References Cited

U.S. PATENT DOCUMENTS

| | | | | |
|---|---|---|---|---|
| 5,104,718 | A * | 4/1992 | Asada | B29C 59/04 264/293 |
| 5,484,642 | A * | 1/1996 | Bompard | B29C 70/547 428/166 |
| 6,478,922 | B1 * | 11/2002 | Rosevear | B29C 70/543 264/319 |
| 6,523,246 | B1 * | 2/2003 | Matsui | B29C 70/44 29/559 |
| 7,168,272 | B2 * | 1/2007 | Dunn | B29C 70/226 66/202 |
| 7,595,112 | B1 * | 9/2009 | Cano | B29C 70/088 427/450 |
| 8,333,864 | B2 * | 12/2012 | Brennan | B29C 70/544 156/285 |
| 2002/0027187 | A1 * | 3/2002 | Sato | B29C 70/44 249/187.1 |
| 2004/0219855 | A1 * | 11/2004 | Tsotsis | B29C 70/443 442/364 |
| 2005/0070182 | A1 | 3/2005 | Dunn | |
| 2005/0070183 | A1 | 3/2005 | Dunn et al. | |
| 2006/0125155 | A1 * | 6/2006 | Sekido | B29C 70/547 264/511 |
| 2008/0295950 | A1 * | 12/2008 | Mack | B29C 70/226 156/145 |
| 2010/0035016 | A1 * | 2/2010 | Ahrens | B29C 70/44 428/113 |
| 2010/0086765 | A1 * | 4/2010 | Inston | C08J 5/24 428/311.51 |
| 2010/0239865 | A1 * | 9/2010 | Kallinen | B29C 70/46 156/196 |
| 2010/0314042 | A1 * | 12/2010 | Luebbering | B29C 70/54 156/286 |
| 2010/0314807 | A1 * | 12/2010 | Lengsfeld | B29C 70/543 264/571 |
| 2013/0069281 | A1 * | 3/2013 | Hurlin | B29C 70/48 425/542 |
| 2014/0353876 | A1 * | 12/2014 | Murai | B29C 70/48 425/406 |
| 2017/0057182 | A1 | 3/2017 | Bernetich et al. | |
| 2019/0299552 | A1 | 10/2019 | Bernetich et al. | |

FOREIGN PATENT DOCUMENTS

| | | |
|---|---|---|
| JP | 3279049 B2 | 2/2002 |
| JP | 2004-130723 A | 4/2004 |
| JP | 2005-232601 A | 9/2005 |
| JP | 2005-262818 A | 9/2005 |
| JP | 2008-137179 A | 6/2008 |
| JP | 2015-071741 A | 4/2015 |

OTHER PUBLICATIONS

PCT/ISA/210, "International Search Report for International Application No. PCT/JP2019/004983," dated May 14, 2019.

PCT/ISA/237, "Written Opinion of the International Searching Authority for International Application No. PCT/JP2019/004983" dated May 14, 2019.

Europe Patent Office, "Search Report for European Patent Application No. 19754442.2," dated Dec. 21, 2020.

Japan Patent Office, "Office Action for Japanese Patent Application 2018-022782," dated Mar. 15, 2022.

* cited by examiner

METHOD FOR PRODUCING COMPOSITE MATERIAL, FIBER BASE MATERIAL, AND SHAPING MOLD FOR FIBER BASE MATERIAL

RELATED APPLICATIONS

The present application is a National Phase of International Application Number PCT/JP2019/004983 filed Feb. 13, 2019 and claims priority to Japanese Application Number 2018-022782 filed Feb. 13, 2018.

TECHNICAL FIELD

The present invention relates to a method for producing a composite material, a fiber base material, and a shaping mold for a fiber base material.

BACKGROUND ART

A composite material composed of a fiber material such as a glass fiber or a carbon fiber and a resin material is produced by various methods, for example, a VaRTM (Vacuum Assisted Resin Transfer Molding) method.

The VaRTM method is to produce a composite material by infiltrating resin into a fiber base material by using vacuum pressure and then curing the infiltrated resin by heating and compressing the fiber base material with the infiltrated resin (refer to, for example, PTL 1).

CITATION LIST

Patent Literature

[PTL 1] Japanese Unexamined Patent Application Publication No. 2008-137179

SUMMARY OF INVENTION

Technical Problem

However, the resin is cured even during the infiltration into the fiber base material and the viscosity thereof increases. Therefore, the thickness of the fiber base material that can be integrally molded without forming an uninfiltrated portion is limited. Accordingly, in the related art, when producing a composite material (thick plate member) having a thick plate portion (a portion having a thickness exceeding a limited thickness), mechanical fastening means, a co-bonding molding method, or the like is used.

A method for producing a composite material using the mechanical fastening means includes preparing a plurality of divided members each having a shape obtained by dividing a thick plate member, separately infiltrating resin into the plurality of divided members, curing the resin, and then, mechanically fastening the members with fasteners (for example, rivets). However, in such a method for producing a composite material, the resin is infiltrated into each of the plurality of divided members, and therefore, the number of resin infiltration steps increases and the number of parts such as fasteners increases. Therefore, this leads to an increase in manufacturing cost and complication of a manufacturing process.

Further, a method for producing a composite material using the co-bonding molding method includes preparing a plurality of divided members each having a shape obtained by dividing a thick plate member, infiltrating resin into one member, and curing the resin, and thereafter, infiltrating resin into the other member, and bonding the other member to one member. However, in such a method for producing a composite material, the resin is infiltrated into each of the plurality of divided members, and therefore, the number of resin infiltration steps increases, and the bonding treatment of the plurality of divided members is required. Therefore, this leads to an increase in manufacturing cost and complication of a manufacturing process.

The present invention has been made in view of the above problems and has an object to easily produce a composite material having a thick plate portion.

Solution to Problem

According to a first aspect of the present invention for solving the above-mentioned problems, there is provided a method for producing a composite material in which a thermosetting resin is infiltrated into a first fabric and a second fabric made of fiber materials and the first fabric and the second fabric are molded integrally, the method including: providing a resin flow path through which the thermosetting resin can flow between the first fabric and the second fabric; and infiltrating the thermosetting resin into the first fabric and the second fabric from surfaces thereof and also from the resin flow path.

According to a second aspect of the present invention for solving the above-mentioned problems, in the method for producing a composite material according to the first aspect of the present invention, a groove portion is provided on the surface of the first fabric, and the resin flow path is defined by the groove portion.

According to a third aspect of the present invention for solving the above-mentioned problems, in the method for producing a composite material according to the second aspect of the present invention, the groove portion is leveled by applying heat and pressure to the first fabric and the second fabric when curing the thermosetting resin.

According to a fourth aspect of the present invention for solving the above-mentioned problems, in the method for producing a composite material according to the second or third aspect of the present invention, the groove portion is coated with a thermoplastic resin or starchy glue.

According to a fifth aspect of the present invention for solving the above-mentioned problems, in the method for producing a composite material according to any one of the second to fourth aspects of the present invention, the groove portion is formed by performing hot compaction by pressing a member having a concave shape or a convex shape on a surface thereof against the first fabric when shaping the first fabric.

According to a sixth aspect of the present invention for solving the above-mentioned problems, in the method for producing a composite material according to any one of the second to fourth aspects of the present invention, the groove portion is formed by performing bagging using a film without disposing a hard material on a surface of a fiber fabric, and then applying pressure and heat, when shaping the first fabric.

According to a seventh aspect of the present invention for solving the above-mentioned problems, there is provided a fiber base material that is made by laminating fiber materials and into which a thermosetting resin is not infiltrated, in which the fiber base material has a plurality of groove portions provided to be connected in a grid pattern on a surface thereof.

According to an eighth aspect of the present invention for solving the above-mentioned problems, there is provided a shaping mold for a fiber base material, which shapes a fiber base material that is made by laminating fiber materials and into which a thermosetting resin is not infiltrated, in which the shaping mold had a concave shape or a convex shape on a pressing surface which is pressed against the fiber base material.

Advantageous Effects of Invention

According to the method for producing a composite material according to the first aspect of the present invention, the thermosetting resin infiltration can be performed reliably and promptly, and therefore, even a composite material having a thick plate portion can be integrally molded and easily produced.

According to the method for producing a composite material according to the second aspect of the present invention, a flow path through which the thermosetting resin can flow can be provided with a simple configuration.

According to the method for producing a composite material according to the third aspect of the present invention, the influence of the groove portion on the mechanical strength or the like can be reduced.

According to the method for producing a composite material according to the fourth aspect of the present invention, a flow path through which the thermosetting resin can flow in a resin infiltration step can be reliably secured.

According to the method for producing a composite material according to the fifth aspect of the present invention, the groove portion can be easily formed.

According to the method for producing a composite material according to the sixth aspect of the present invention, the groove portion can be easily formed.

According to the fiber base material according to the seventh aspect of the present invention, the fiber base material can be used as a fiber base material which is used in the methods for producing a composite material according to the first to sixth aspects of the present invention.

According to the shaping mold for a fiber base material according to the eighth aspect of the present invention, the fiber base material which is used in the methods for producing a composite material according to the first to sixth aspects of the present invention and the fiber base material according to the seventh aspect of the present invention can be easily shaped.

DESCRIPTION OF EMBODIMENTS

Hereinafter, an embodiment of a method for producing a composite material according to the present invention will be described in detail with reference to the accompanying drawings. Of course, the present invention is not limited to the following embodiment, and it goes without saying that various modifications can be made within a scope which does not depart from the gist of the present invention.

Main Embodiment

Figure 1:
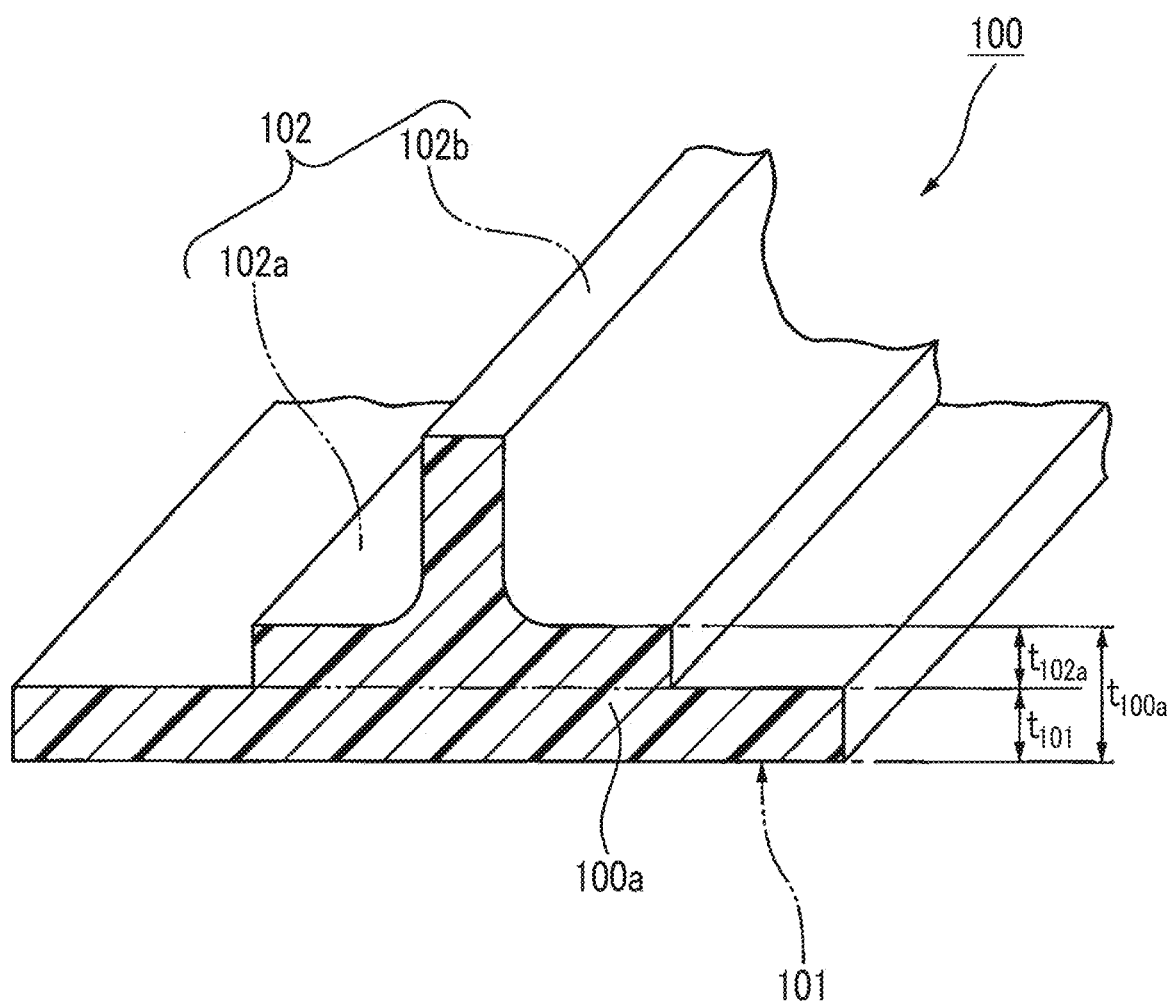
FIG. 1 is an explanatory diagram (schematic perspective view) of a main embodiment of a composite material which is produced by a method for producing a composite material according to the present invention.
Figure 2:
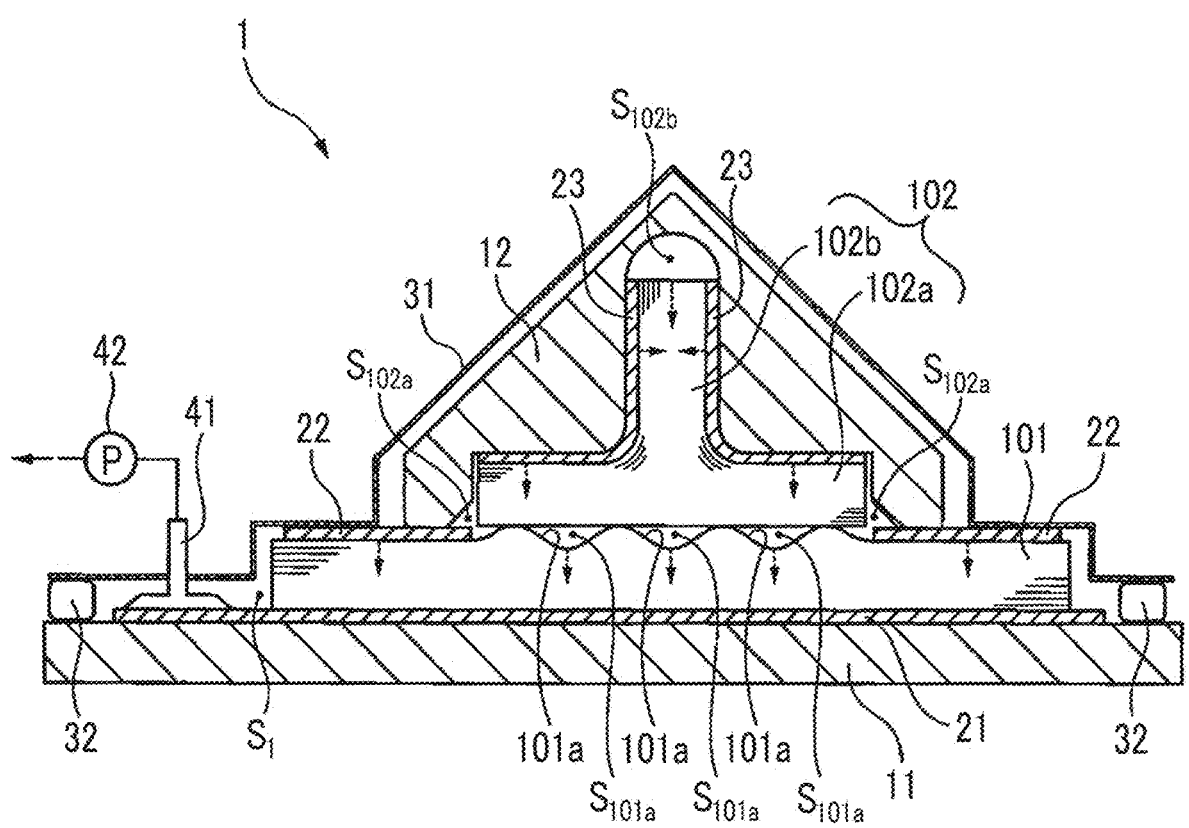
FIG. 2 is an explanatory diagram (schematic sectional view) showing a structure of a main embodiment of a composite material manufacturing apparatus which is used in the method for producing a composite material according to the present invention.

The method for producing a composite material according to this embodiment uses a composite material manufacturing apparatus (reference numeral 1 in FIG. 2) and integrally molds a composite material (reference numeral 100 in FIG. 1) having a thick plate portion by simultaneously infiltrating resin into a plurality of fiber base materials (reference numerals 101 and 102 in FIG. 2).

The composite material which is produced by the method for producing a composite material according to this embodiment, and the fiber base material which is used for the production of the composite material will be described with reference to FIGS. 1, 2, and 3A.

As shown in FIG. 1, the composite material 100 which is produced by the method for producing a composite material according to this embodiment is a skin-stringer member provided with a flat plate-shaped portion (a skin member) and a beam portion (a stringer member) protruding from the surface of the flat plate-shaped portion, and has a thick plate portion 100*a* whose thickness is partially large.

In the production of the composite material 100, a plurality of (in this embodiment, two) fiber base materials 101 and 102 (refer to FIG. 2) are used, and the composite material 100 is produced by simultaneously infiltrating a thermosetting resin into the fiber base materials 101 and 102 and curing the resin.

As shown in FIGS. 1 and 2, one fiber base material (a first fabric) 101 which is used in the method for producing a composite material according to this embodiment configures the skin member and is formed by laminating fiber materials such as glass fibers or carbon fibers in a flat plate shape.

The other fiber base material (a second fabric) 102 which is used in the method for producing a composite material according to this embodiment configures the stringer member, is formed by laminating fiber materials such as glass fibers or carbon fibers in a substantially T-shaped cross section, and is roughly composed of a base portion 102*a* which is joined to the first fabric 101 and a beam portion 102*b* protruding from substantially the center of the base portion 102*a*.

A thickness (plate thickness) $t_{101}$ of the first fabric 101 and a thickness (plate thickness) $t_{102a}$ of the base portion 102*a* in the second fabric 102 are respectively plate thicknesses capable of sufficiently infiltrating resin even by a method for producing a composite material of the related art, and a thickness $t_{100a}$ of the thick plate portion 100*a* in the composite material 100 is equivalent to the sum of the plate thickness tin and the plate thickness $t_{102a}$ and is set to a plate thickness into which resin cannot be sufficiently infiltrated by the method for producing a composite material of the related art (refer to FIG. 1).

As shown in FIG. 2, the surface (upper surface) of the first fabric 101 is formed in a concave-convex shape, and a plurality of groove portions 101a are formed by the concave-convex shape. The groove portions 101a are provided in a range which is joined to the second fabric 102, and when the first fabric 101 and the second fabric 102 are installed in the composite material manufacturing apparatus 1 in the process of producing the composite material 100, a gap space (a resin flow path) $S_{101a}$ is defined between the first fabric 101 (the groove portion 101a) and the second fabric 102.

The resin flow path $S_{101a}$ functions as a resin flow path through which a thermosetting resin can flow in a resin infiltration step (described later). Therefore, the groove portion 101a has mechanical strength and heat-resistant strength to the extent that the shape thereof does not collapse in the resin infiltration step (described later), and has a flow path cross section through which the thermosetting resin can flow.

Here, in consideration of the flowability of the thermosetting resin, it is preferable that the plurality of groove portions 101a are provided to be orthogonal to each other (or intersect each other at a predetermined angle) and be connected to each other (provided to be connected in a grid pattern) on the surface of the first fabric 101 (the joint surface between the first fabric 101 and the second fabric 102). Further, in consideration of the flowability of the thermosetting resin, it is preferable that a height (depth) h of the groove portion 101a is set to be 0.2 [mm] or more (h≥0.2 mm), and a distance (disposition interval) d between the groove portions 101a which are disposed adjacent to each other is set to be less than 30 [mm] (d<30 mm) (refer to FIG. 3A).

Next, the configuration of the composite material manufacturing apparatus which is used in the method for producing a composite material according to this embodiment will be described with reference to FIG. 2.

As shown in FIG. 2, the composite material manufacturing apparatus 1 which is used in the method for producing a composite material according to this embodiment includes molding tools 11 and 12 for molding the first fabric 101 and the second fabric 102 into the composite material 100.

The molding tool (lower mold) 11 which is disposed on the lower side has a surface shape corresponding to the lower surface of the composite material 100 and is made such that the first fabric 101 is placed thereon with a mesh-like resin suction medium 21 interposed therebetween. The molding tool (upper mold) 12 which is disposed on the upper side has a surface shape corresponding to the upper surface of the composite material 100 and is made so as to cover the first fabric 101 and the second fabric 102 placed on the lower mold 11 through mesh-like resin supply media (a first resin supply medium and a second resin supply medium) 22 and 23.

Here, predetermined gap spaces (a first resin supply flow path and a second resin supply flow path) $S_{102a}$ and $S_{102b}$ are formed between the upper mold 12, and the first fabric 101 and the second fabric 102. The first resin supply flow path $S_{102a}$ and the second resin supply flow path $S_{102b}$ function as flow paths through which the thermosetting resin flows in the resin infiltration step (described later) and are each connected to a resin supply device (not shown).

Here, the first resin supply flow path $S_{102a}$ which is formed in the vicinity of the joint portion between the first fabric 101 and the second fabric 102 (the vicinity of an end portion of the base portion 102a in the second fabric 102) communicates with the resin flow path $S_{101a}$ which is formed between the first fabric 101 and the second fabric 102, and thus, the thermosetting resin which is supplied from the resin supply device (not shown). to the first resin supply flow path $S_{102a}$ is supplied to the resin flow path $S_{101a}$.

Further, the composite material manufacturing apparatus 1 includes a vacuum bag film 31 made of nylon, polyester, or the like, and a sealant 32 that seals the gap between the vacuum bag film 31 and the lower mold 11 at the periphery of the vacuum bag film 31.

Further, the vacuum bag film 31 is provided with a suction nozzle 41, and a vacuum pump 42 is connected to the suction nozzle 41. Therefore, air in a space (sealed space) $S_1$ in which the first fabric 101, the second fabric 102, and the upper mold 12 are installed, and which is sealed by the lower mold 11, the vacuum bag film 31, and the sealant 32, is sucked from the suction nozzle 41 by the vacuum pump 42.

The procedure of the method for producing a composite material according to this embodiment will be described with reference to FIGS. 2, 3A, and 3B.

First, each of the first fabric 101 and the second fabric 102 is shaped by laminating fiber materials into a predetermined shape (fiber base material shaping step).

In the fiber base material shaping step for the first fabric 101, when hot-compacting a laminate of fiber materials (unidirectional or multidirectional fiber materials or fiber fabric), a member (a covering material or a shaping mold) having a concave-convex shape on the surface thereof is used to transfer the concave-convex shape to the surface of the first fabric 101. According to this shaping method, it is possible to easily obtain the first fabric 101 having the concave-convex shape (the groove portions 101a).

Figure 4:
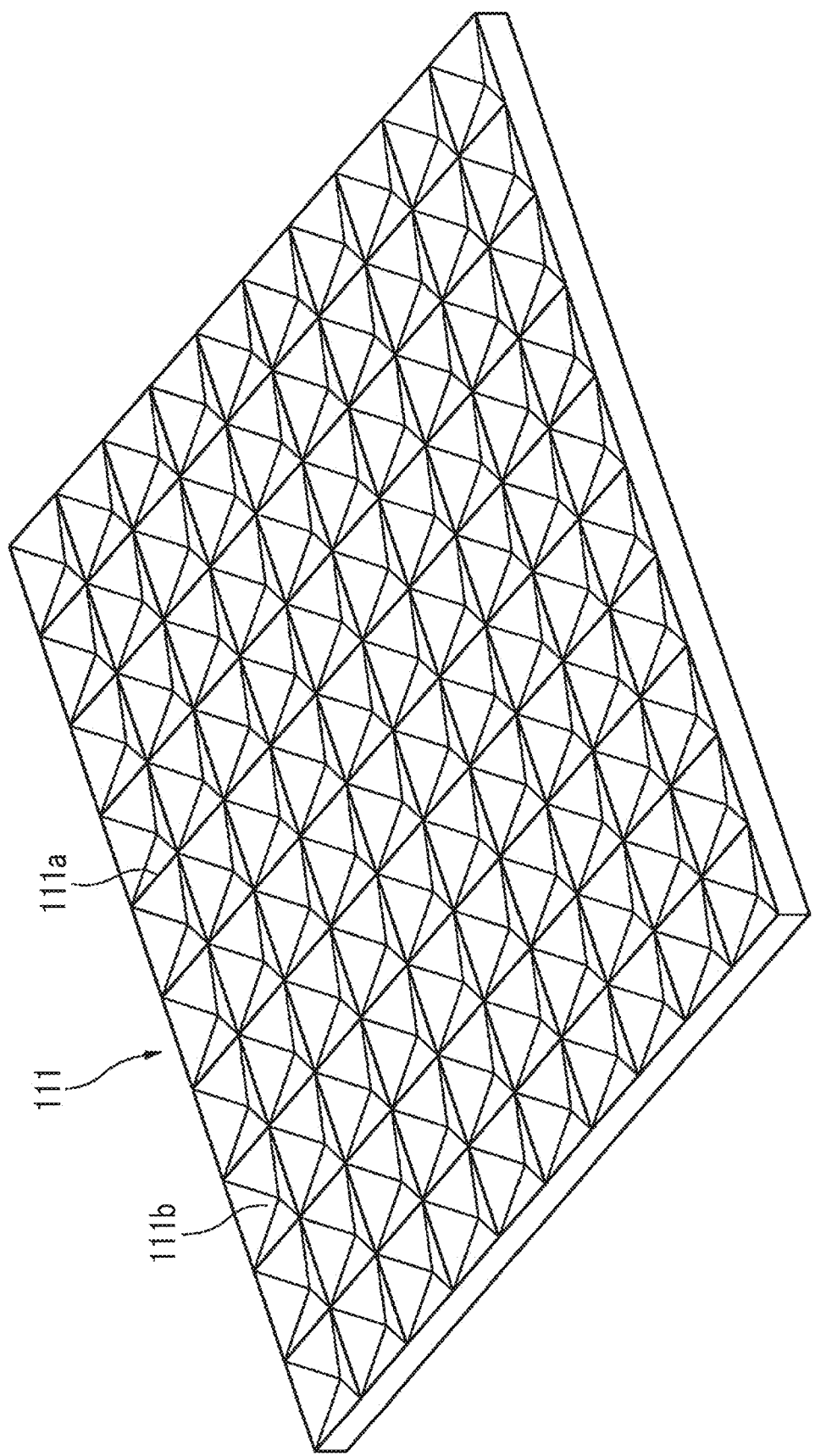
FIG. 4 is an explanatory diagram (schematic perspective view) showing a structure of a main embodiment of a shaping mold which is used in the method for producing a composite material according to the present invention.

Here, as the member having a concave-convex shape on the surface, for example, a shaping mold 111 having a protrusion portion 111a and a recess portion 111b, as shown in FIG. 4, can be adopted. A large number of recess portions 111b are provided side by side on the surface of the shaping mold 111, and the protrusion portions 111a are provided to be connected in a grid pattern between the recess portions 111b adjacent to each other. Therefore, in a case where the shaping mold 111 is used to transfer the concave-convex shape (the protrusion portions 111a and the recess portions 111b) on the surface thereof to the surface of the first fabric 101, the groove portions 101a of the first fabric 101 are formed by the protrusion portions 111a of the shaping mold 111. At this time, the groove portions 101a of the first fabric 101 have shapes corresponding to the protrusion portions 111a of the shaping mold 111, that is, shapes connected in a grid pattern on the surface of the first fabric 101.

Of course, the method of shaping the first fabric 101 is not limited to the method described above, and, for example, a shaping method may be adopted in which a laminate of fiber materials (a fiber fabric) is subjected to bagging by using a familiar film or the like without disposing a hard material (for example, a metal pressure plate or the like) on the surface thereof and heating is then performed while applying vacuum pressure, pressurization by an autoclave, water pressure, or the like. According to this shaping method, the first fabric 101 having the concave-convex shape (the groove portions 101a) can be easily obtained by using the concave-convex shape on the surface of the fabric itself.

Further, when shaping the first fabric 101 having a concave-convex shape (the groove portions 101a) by the shaping method described above, by coating the surface having the concave-convex shape (the groove portions 101a) with bale-shaped or powder-shaped thermoplastic resin, it is possible to provide desired mechanical strength and heat-resistant strength to the concave-convex shape (the groove portions 101a). Of course, the material that maintains the concave-convex shape (the groove portions 101a) is not limited to the thermoplastic resin and may be any material having a function capable of restraining deformation in an out-of-plane direction, such as starchy glue, for example.

As the thermoplastic resin that provides desired mechanical strength and heat-resistant strength to the concave-convex shape (the groove portions 101a), a thermoplastic resin is used in which a temperature (softening temperature) at which the viscosity thereof is lowered is higher than a thermosetting resin infiltration temperature in the resin infiltration step (described below) and lower than a thermosetting resin curing temperature in the resin curing step (described later).

Subsequently, the first fabric 101 and the second fabric 102 are installed in the composite material manufacturing apparatus 1, and a thermosetting resin is infiltrated into the first fabric 101 and the second fabric 102 (resin infiltration step).

Figure 3A:
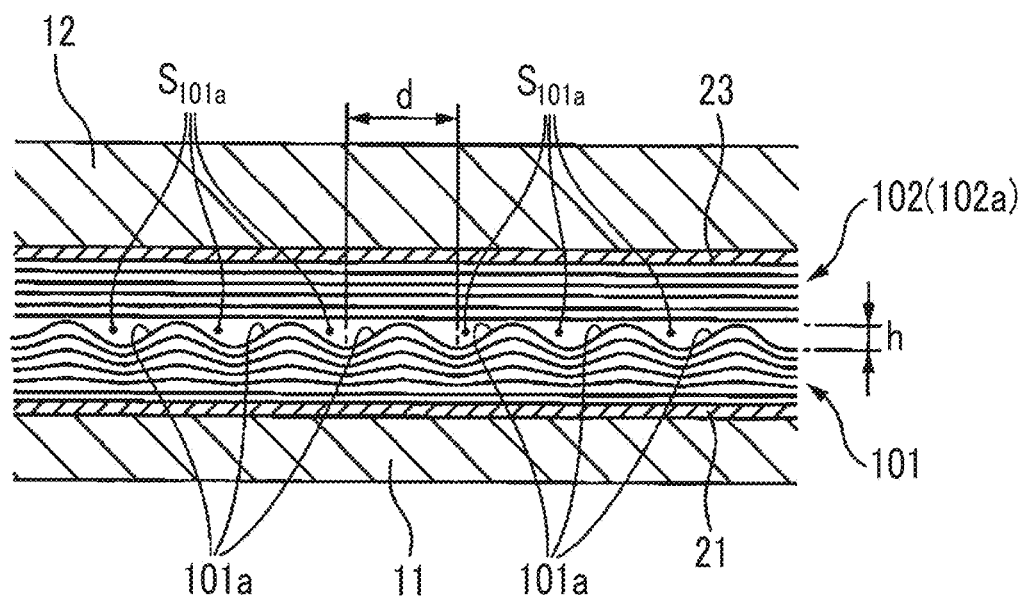
FIG. 3A is an explanatory diagram showing a procedure of a resin infiltration step in the main embodiment of the method for producing a composite material according to the present invention.

The resin infiltration step is performed by making the sealed space $S_1$ be in a vacuum state by driving the vacuum pump 42, and supplying a thermosetting resin from the resin supply device (not shown) to the first resin supply flow path $S_{102a}$ and the second resin supply flow path $S_{102b}$ (refer to FIGS. 2 and 3A). The thermosetting resin supplied to the first resin supply flow path $S_{102a}$ and the second resin supply flow path $S_{102b}$ is diffused by the first resin supply medium 22 and the second resin supply medium 23, respectively, and permeates from the surfaces of the first fabric 101 and the second fabric 102 into the interiors thereof (refer to the dashed arrows in FIG. 2). Further, the thermosetting resin supplied to the first resin supply flow path $S_{102a}$ is supplied to the resin flow path $S_{101a}$ communicating with the first resin supply flow path $S_{102a}$ and penetrates from the resin flow path $S_{101a}$ to the interior of the first fabric 101 (refer to the dashed arrows in FIG. 2).

In this manner, the thermosetting resin infiltration is performed not only from the surfaces of the first fabric 101 and the second fabric 102 respectively provided with the first resin supply medium 22 and the second resin supply medium 23 but also from the resin flow path $S_{101a}$ between the first fabric 101 and the second fabric 102, whereby the infiltration of the first fabric 101 and the second fabric 102 with the thermosetting resin can be performed reliably and promptly.

Subsequently, the thermosetting resin infiltrated into the first fabric 101 and the second fabric 102 is thermally cured (resin curing step).

Figure 3B:
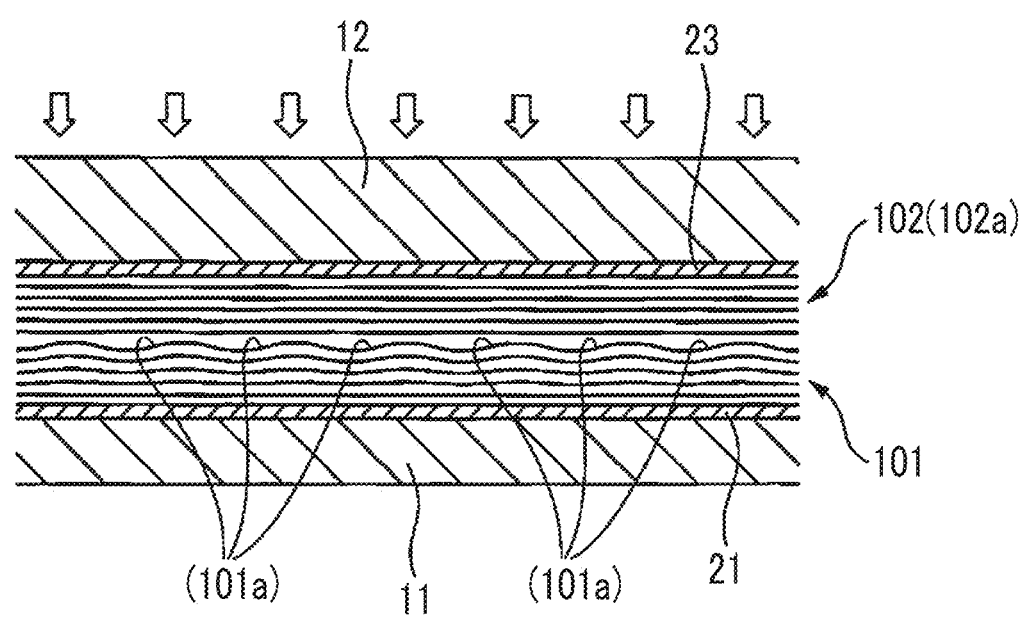
FIG. 3B is an explanatory diagram showing a procedure of a resin curing step in the main embodiment of the method for producing a composite material according to the present invention.

The resin curing step is performed by heating the molding tools 11 and 12 by an oven (not shown) and applying pressure so as to press the upper mold 12 against the first fabric 101 and the second fabric 102 on the lower mold 11 (refer to arrows in FIG. 3B). Therefore, the first fabric 101 and the second fabric 102 are heated and pressurized by the molding tools 11 and 12.

At this time, the thermoplastic resin coated on the first fabric 101 is softened by the heating in the resin curing step, and the concave-convex shape (the groove portions 101a) formed on the first fabric 101 is leveled by the pressurization in the resin curing step.

In this manner, by leveling the concave-convex shape (the groove portions 101a) provided in the first fabric 101 and making the surface of the first fabric 101 (the joint surface with the second fabric 102) substantially flat, it is possible to suppress (prevent) a decrease in mechanical strength that can be caused by the influence of the concave-convex shape (curing while the fiber materials are bent).

According to the method for producing a composite material according to this embodiment, by providing the resin flow path $S_{101a}$ through which the thermosetting resin can flow between the first fabric 101 and the second fabric 102, and infiltrating the thermosetting resin into the first fabric 101 and the second fabric 102 from the surfaces thereof and also from the resin flow path $S_{101a}$, the thermosetting resin infiltration can be performed reliably and promptly, and therefore, the composite material 100 having the thick plate portion 100a can be integrally molded.

In this embodiment, the groove portions 101a are formed by making the surface of the first fabric 101 have a concave-convex shape, and the resin flow paths $S_{101a}$ are formed between the first fabric 101 and the second fabric 102 by the groove portions 101a. Of course, the present invention is not limited to this.

For example, a configuration may be adopted in which only a recess portion is formed on the surface (upper surface) of the first fabric and a gap space (a resin flow path) is formed between the first fabric and the second fabric by the recess portion (a groove), and a configuration may be adopted in which only a protrusion portion is formed on the surface of the first fabric and a gap space (a resin flow path) is formed between the first fabric and the second fabric by the protrusion portion (a groove which is formed between protrusion portions).

Further, a gap space (a resin flow path) may be formed between the first fabric and the second fabric by making not only the surface (upper surface) of the first fabric but also the surface (lower surface) of the second fabric have a concave-convex shape, and a gap space (a resin flow path) may be formed between the first fabric and the second fabric by making only the surface (lower surface) of the second fabric have a concave-convex shape (alternatively, by forming a recess portion or a protrusion portion on the surface).

It is preferable to provide a groove portion on the surface of one fiber base material and make the surface of the other fiber base material flat. This is because the shape or the like of a gap space can be set only by the shaping of one fiber base material and a uniform gap space can be easily defined. Further, the surface of the other fiber base material is flat, and therefore, in the resin curing step, it is possible to level the concave-convex shape in one fiber base material and easily flatten the surface of the fiber base material.

Further, in this embodiment, the composite material 100 is produced by providing the resin flow path $S_{101a}$ between two fiber base materials: the first fabric 101 and the second fabric 102.

Of course, the present invention is not limited to this, and a structure in which fiber base materials are stacked in three or more stages may be integrally molded. When the fiber base materials are stacked in three or more stages and are integrally molded, in order to more reliably and promptly perform resin infiltration, it is preferable to provide a gap space between the layers of the respective stages and it is preferable to provide a resin supply flow path that communicates with a gap space between the layers of the respective stages.

REFERENCE SIGNS LIST

1: composite material manufacturing apparatus
11: molding tool (lower mold)
12: molding tool (upper mold)
21: resin suction medium 22: first resin supply medium
23: second resin supply medium
31: vacuum bag film
32: sealant
41: suction nozzle
42: vacuum pump
100: composite material
100$a$: thick plate portion in composite material
101: first fabric
101$a$: groove portion (concave-convex shape) in first fabric
102: second fabric
102$a$: base portion in second fabric
102$b$: beam portion in second fabric
111: shaping mold
111$a$: protrusion portion in shaping mold
111$b$: recess portion in shaping mold
$S_1$: sealed space
$S_{101a}$: resin flow path (gap space)
$S_{102a}$: first resin supply flow path (gap space)
$S_{102b}$: second resin supply flow path (gap space)
$t_{100a}$: thickness of thick plate portion in composite material
$t_{101}$: thickness (plate thickness) of first fabric
$t_{102a}$: thickness (plate thickness) of base portion in second fabric
d: disposition interval of groove portions in first fabric
h: height (depth) of groove portion in first fabric

The invention claimed is:

1. A method for producing a composite material, comprising:
    forming a groove portion on a surface of a first fabric to define a resin flow path by the groove portion by performing hot compaction by pressing a member having a concave shape or a convex shape on a surface thereof against the first fabric when shaping the first fabric;
    disposing the first fabric on a lower mold;
    disposing a second fabric on the groove portion of the first fabric to provide the resin flow path through which a thermosetting resin can flow between the first fabric and the second fabric;
    covering an upper mold on the first fabric and the second fabric via mesh-shaped resin supply media; and
    infiltrating the thermosetting resin into the first fabric and the second fabric from surfaces thereof and also from the resin flow path,
    wherein the groove portion is provided only in a range in which the first fabric and the second fabric are joined to each other, and
    wherein the first fabric is a skin member, and the second fabric is a stringer protruding from the skin member.

2. The method for producing a composite material according to claim 1, wherein the groove portion is leveled by applying heat and pressure to the first fabric and the second fabric when curing the thermosetting resin.

3. The method for producing a composite material according to claim 1, wherein the groove portion is coated with a thermoplastic resin or starchy glue.

4. A method for producing a composite material, comprising:
    forming a groove portion on a surface of a first fabric to define a resin flow path by the groove portion by performing hot compaction by pressing a member having a concave shape or a convex shape on a surface thereof against the first fabric when shaping the first fabric;
    preparing a second fabric having a substantially T-shaped cross section composed of a base portion joined to the first fabric, and a beam portion protruding from substantially a center of the base portion, the base portion having a width shorter than a width of the first fabric and being disposed above the groove portion;
    disposing the first fabric on a lower mold;
    disposing the second fabric on the groove portion of the first fabric to provide the resin flow path through which a thermosetting resin can flow between the first fabric and the second fabric;
    covering an upper mold on the first fabric and the second fabric via mesh-shaped resin supply media; and
    infiltrating the thermosetting resin into the first fabric and the second fabric from surfaces thereof and also from the resin flow path,
    wherein the groove portion is provided only in a range in which the first fabric and the second fabric are joined to each other.

5. The method for producing a composite material according to claim 4, wherein the infiltrating the thermosetting resin includes providing the thermosetting resin from a top of the beam portion.

* * * * *